(12) United States Patent
Muir

(10) Patent No.: US 9,827,897 B1
(45) Date of Patent: Nov. 28, 2017

(54) VEHICLE COURTESY LIGHT

(71) Applicant: Doreen Muir, Ocoee, FL (US)

(72) Inventor: Doreen Muir, Ocoee, FL (US)

( * ) Notice: Subject to any disclaimer, the term of this patent is extended or adjusted under 35 U.S.C. 154(b) by 1 day.

(21) Appl. No.: 15/044,515

(22) Filed: Feb. 16, 2016

(51) Int. Cl.
*B60Q 1/26* (2006.01)
*B60Q 1/00* (2006.01)
*B60Q 1/50* (2006.01)

(52) U.S. Cl.
CPC ......... *B60Q 1/0035* (2013.01); *B60Q 1/0076* (2013.01); *B60Q 1/2665* (2013.01); *B60Q 1/503* (2013.01)

(58) Field of Classification Search
CPC .. B60Q 1/0035; B60Q 1/0076; B60Q 1/2665; B60Q 1/503
USPC .......................................................... 340/468
See application file for complete search history.

(56) References Cited

U.S. PATENT DOCUMENTS

| | | | |
|---|---|---|---|
| 3,905,017 A | 9/1975 | Samra | |
| 4,868,542 A | 9/1989 | Thompson | |
| 5,016,996 A | 5/1991 | Ueno | |
| 5,119,278 A | 6/1992 | Watson | |
| 5,379,198 A | 1/1995 | Zhang | |
| 5,574,428 A | 11/1996 | Groover | |
| 6,553,285 B1 * | 4/2003 | Bahmad | B60Q 1/503 116/42 |
| 7,659,808 B1 * | 2/2010 | Cooper | B60Q 1/503 340/425.5 |
| D647,971 S | 11/2011 | Browne | |
| 2003/0127513 A1 * | 7/2003 | DeVries, Jr. | B60R 1/12 235/380 |
| 2005/0134441 A1 * | 6/2005 | Somuah | B60Q 1/525 340/435 |
| 2005/0274050 A1 * | 12/2005 | Liu | G09F 21/04 40/544 |
| 2007/0030139 A1 * | 2/2007 | Ellison | B60Q 1/503 340/482 |
| 2008/0284578 A1 * | 11/2008 | Mouratidis | B60Q 1/503 340/468 |
| 2009/0000166 A1 * | 1/2009 | Gallet | G09F 13/14 40/582 |
| 2012/0098652 A1 * | 4/2012 | Varella | B60Q 1/503 340/425.5 |
| 2012/0313515 A1 * | 12/2012 | Park | G09F 13/16 313/512 |
| 2014/0002260 A1 * | 1/2014 | Wright | B60Q 1/26 340/468 |
| 2014/0267014 A1 * | 9/2014 | Williams | B60Q 1/503 345/156 |
| 2015/0197185 A1 * | 7/2015 | Jones | B60Q 1/50 340/468 |

(Continued)

FOREIGN PATENT DOCUMENTS

WO          WO9311966 A1     6/1993

*Primary Examiner* — Naomi Small

(57) ABSTRACT

The vehicle courtesy light is adapted for use with vehicles. Specifically, the vehicle courtesy light provides for two signaling lamps that are installed in the electrical system of a vehicle. The two signaling lamps are configured to visually display courtesies initiated by the driver to the drivers of other vehicles. A first signaling lamp displays the phrase "Thank You". The second signaling lamp displays the phrase the "U-Welcome." The vehicle courtesy light comprises a mirror display, a rear display, a first switch, and a second switch.

1 Claim, 4 Drawing Sheets

(56) References Cited

U.S. PATENT DOCUMENTS

2015/0258928 A1* 9/2015 Goto .................. B60Q 1/085
701/49

* cited by examiner
VEHICLE COURTESY LIGHT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of lighting and optical signaling for vehicles, more specifically, an inter-vehicle courtesy signal.

SUMMARY OF INVENTION

The vehicle courtesy light is adapted for use with vehicles. Specifically, the vehicle courtesy light provides for two signaling lamps that are installed in the electrical system of a vehicle. The two signaling lamps are configured to visually display courtesies initiated by the driver to the drivers of other vehicles. A first signaling lamp displays the phrase "Thank You". The second signaling lamp displays the phrase the "U-Welcome."

These together with additional objects, features and apparent to those of ordinary skill in the art upon reading the following detailed description of the presently preferred, but nonetheless illustrative, embodiments when taken in conjunction with the accompanying drawings.

In this respect, before explaining the current embodiments of the vehicle courtesy light in detail, it is to be understood that the vehicle courtesy light is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the vehicle courtesy light.

It is therefore important that the claims be regarded as including such equivalent construction insofar as they do not depart from the spirit and scope of the vehicle courtesy light. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
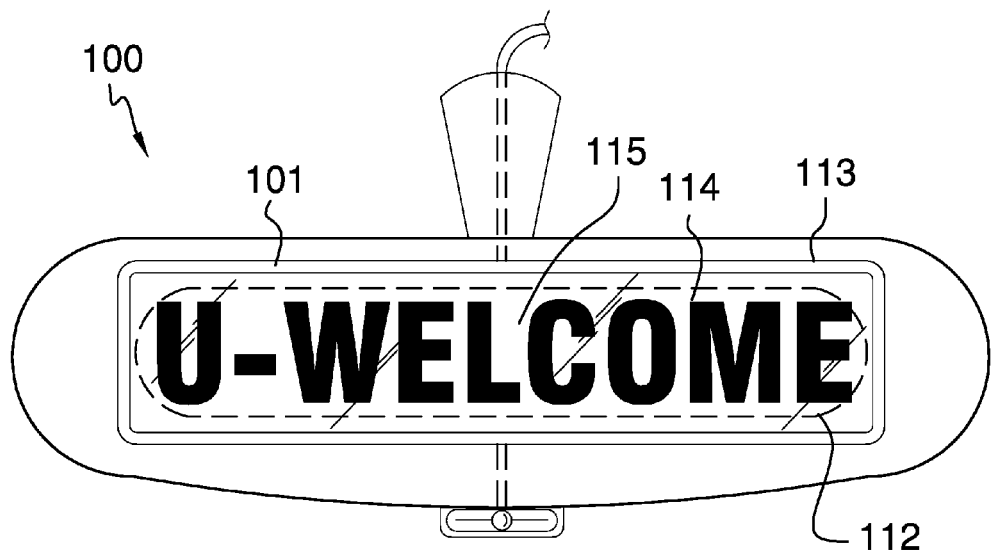
FIG. 1 is a front view of a detail of an embodiment of the disclosure.
Figure 2:
FIG. 2 is a front view of a detail of an embodiment of the disclosure.
Figure 3:
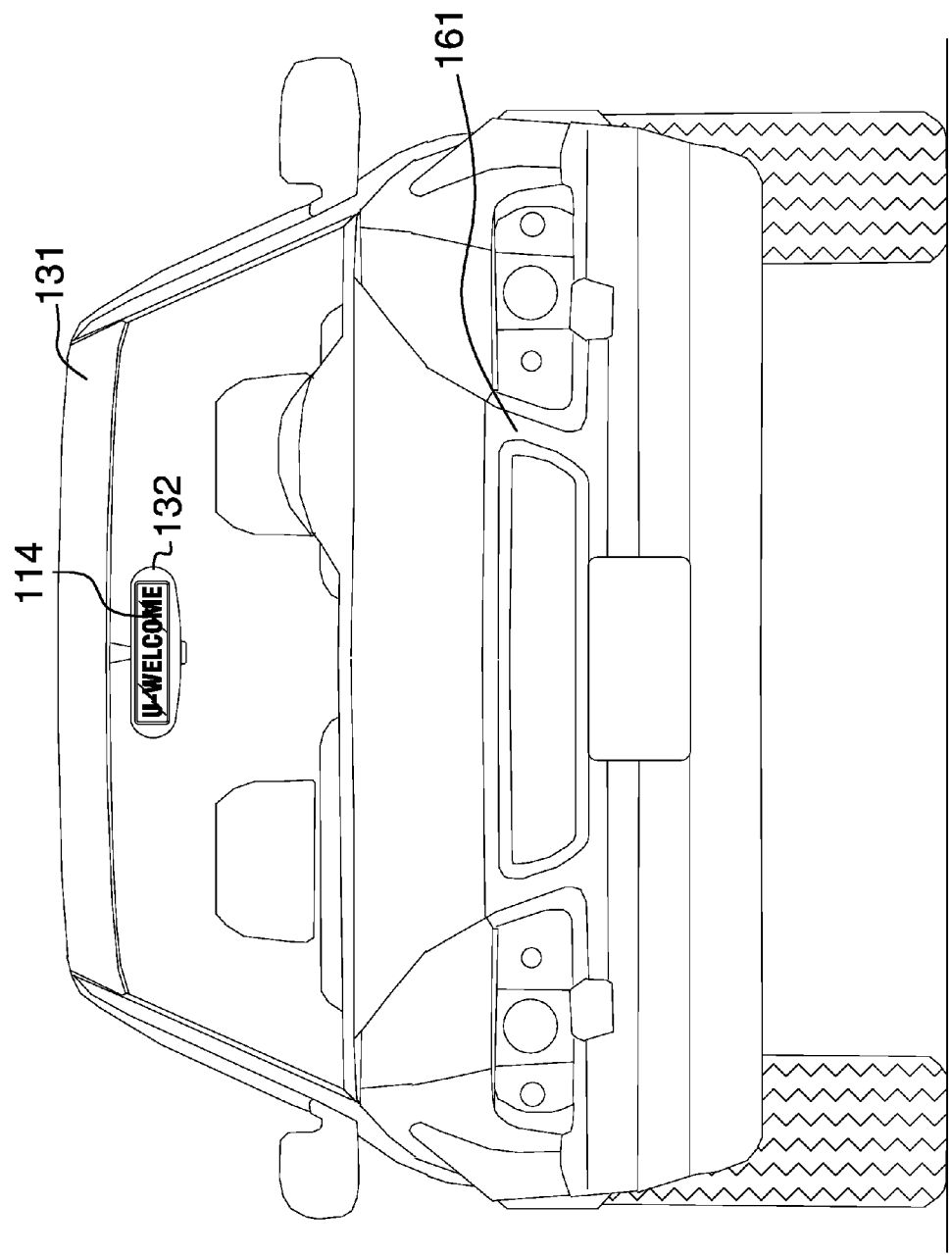
FIG. 3 is an in use view of an embodiment of the disclosure.
Figure 4:
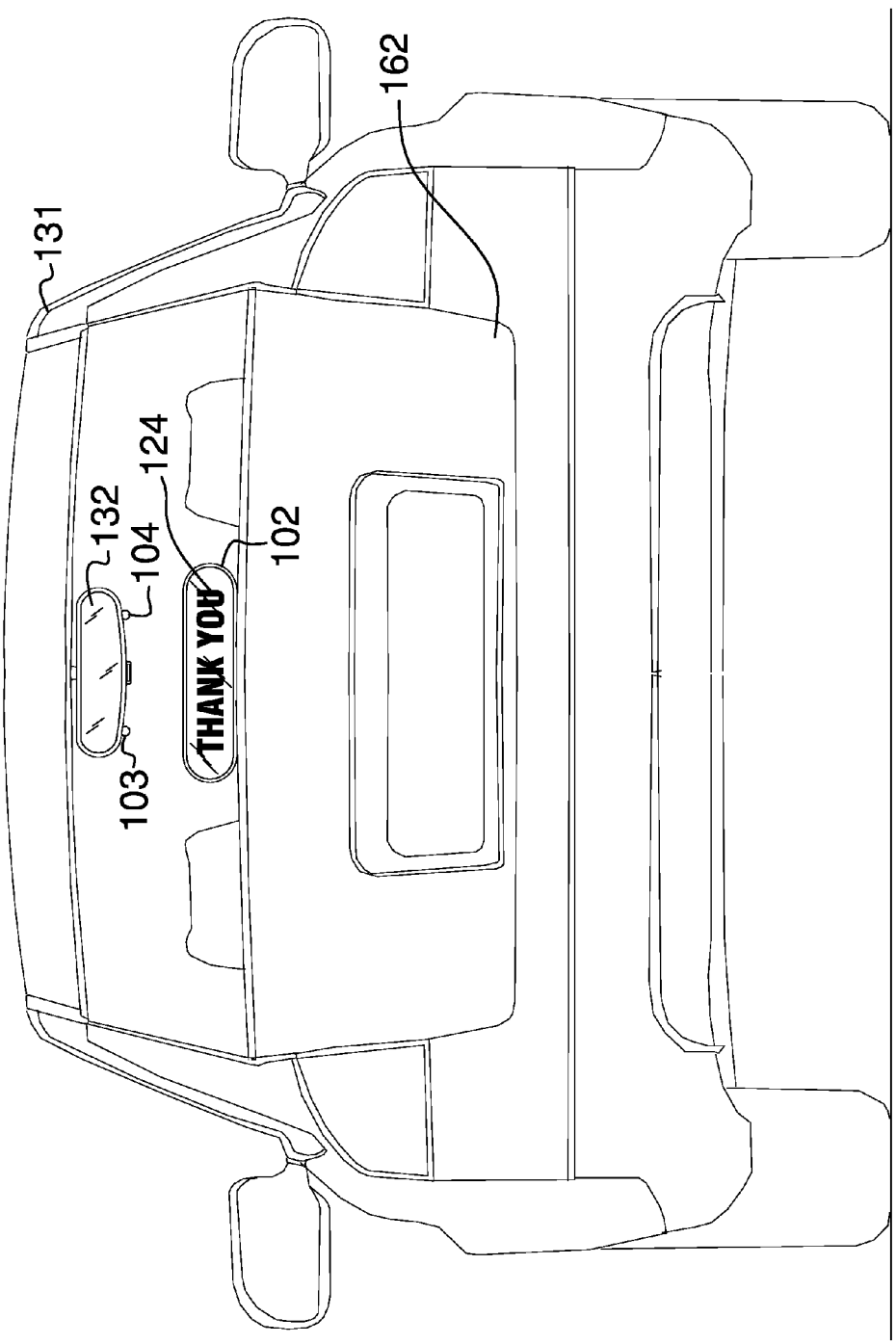
FIG. 4 is an in use view of an embodiment of the disclosure.
Figure 5:
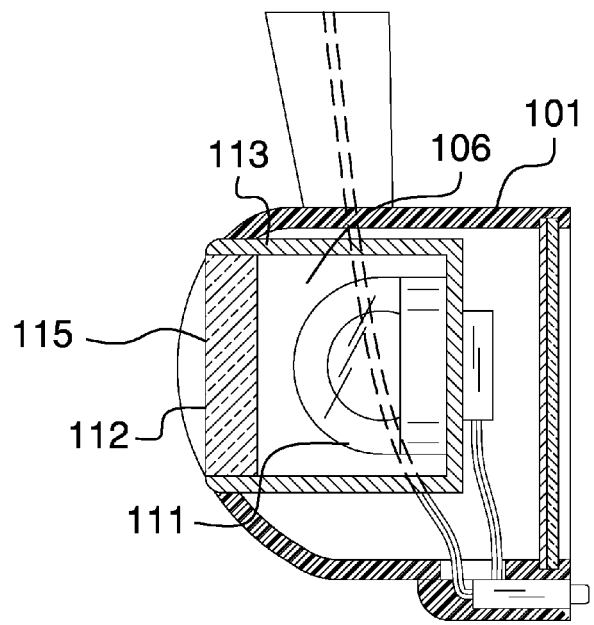
FIG. 5 is a cross-sectional view of an embodiment of the disclosure.
Figure 6:
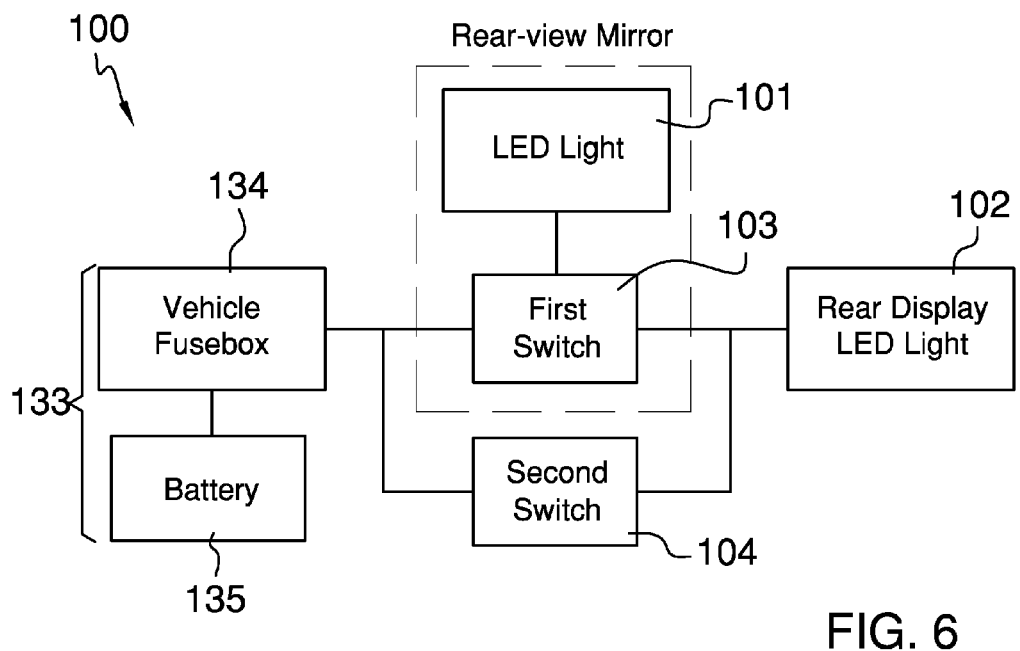
FIG. 6 is a block diagram of an embodiment of the disclosure.

Detailed reference will now be made to a first potential embodiment of the disclosure, which is illustrated in FIGS. 1 through 6.

The vehicle courtesy light 100 (hereinafter invention) comprises a mirror display 101, a rear display 102, a first switch 103, and a second switch 104. The invention 100 is adapted for use with a vehicle 131. The vehicle 131 is further defined with a front 161 and a rear 162. The invention 100 is adapted to be installed into the vehicle 131 electrical system 133. The mirror display 101 is configured to display a first courtesy message 114. The rear display 102 is configured to display a second courtesy message 124.

The mirror display 101 further comprises a mirror light 111, a mirror display template 112, and a mirror housing 113. The mirror housing 113 is an enclosure that contains the mirror light 111 and the mirror display template 112. The mirror housing 113 is configured to mount on the rearview mirror 132 of the vehicle 131 such that the mirror display 101 faces the front 161 direction. The interior 106 of the mirror housing 113 is made of a reflective surface that is designed to project the maximum amount of light out of the mirror housing 113. Methods to make such reflective surfaces are well known in the optical arts. The mirror light 111 is a lamp that is mounted within the mirror housing 113 that is used to illuminate the first courtesy message 114 that is contained in the mirror display template 112. The mirror display template 112 is a stencil type structure that is placed in a first opening 115 through which light is able to exit the mirror housing 113. When the mirror light 111 is illuminated, the mirror display template 112 blocks the light exiting the mirror housing 113 such that the first courtesy message 114 is clearly visible when viewed from the front 161 of the vehicle 131.

The rear display 102 further comprises a rear light 121, a rear display template 122, and a rear housing 123. The rear housing 123 is an enclosure that contains the rear light 121 and the rear display template 122. The rear housing 123 is configured to mount on the rear 132 of the vehicle 131 such that the rear display 102 faces the rear 162 direction. The interior 106 of the rear housing 123 is made of a reflective surface that is designed to project the maximum amount of light out of the well known in the optical arts. The rear light 121 is a lamp that is mounted within the rear housing 123 that is used to illuminate the second courtesy message 124 that is contained in the rear display template 122. The rear display template 122 is a stencil type structure that is placed in a second opening 125 through which light is able to exit the rear housing 123. When the rear light 121 is illuminated, the rear display template blocks 122 the light exiting the rear housing 123 such that the second courtesy message 124 is clearly visible when viewed from the rear 162 of the vehicle 131.

The mirror display 101 further comprises a first switch 103. As shown most clearly in FIG. 6, the mirror display 101 draws power from the battery 135 and through the fuse box 134 of the vehicle 131 electrical system 133. A first switch 103 is placed in series to control the flow of electricity from the fuse box 134 to the mirror display 101. The first switch 103 is a normally open momentary switch that will only illuminate the first courtesy message 114 while the user holds the first switch 103 in the closed position. The first switch 103 is mounted on the mirror housing 113 such that it is readily accessible to the driver of the vehicle 131.

The rear display 102 further comprises a second switch 104. As shown most clearly in FIG. 6, the rear display 102 draws vehicle 131 electrical system 133. A second switch 104 is placed in series to control the flow of electricity from the fuse box 134 to the rear display 102. The second switch 104 is a normally open momentary switch that will only illuminate the second courtesy message 124 while the user holds the second switch 104 in the closed position. The second switch 104 is mounted on the mirror housing 113 such that it is readily accessible to the driver of the vehicle 131.

To use the invention 100, the driver activates the first switch 103 to illuminate the first courtesy message 114. Alternatively, the driver activates the second switch 104 to illuminate the second courtesy message 124. For example, as shown in FIGS. 1 through 4, in the first potential embodiment of the disclosure, the first courtesy message 114 is "U-Welcome" and the second courtesy message 124 is "Thank You". When a driver allows a second vehicle to merge into traffic ahead of themselves, the driver can activate the first switch 103 to send the courtesy message "U-Welcome" to the second vehicle ahead of the driver. Alternatively, when the driver is allowed to merge into traffic ahead of another second vehicle, the driver can activate the second switch 104 to send the courtesy message "Thank You" to the second vehicle behind the driver.

In the first potential embodiment of the disclosure, the rear housing 123 is molded as a single unit from plastic. The mirror display template 112 is molded as a single unit from plastic. The rear display template 122 is molded as a single unit from plastic. Suitable plastics include, but are not limited to, polycarbonate. The first courtesy message 114 displayed with the mirror display template 112 is "U-Welcome". The second courtesy message 124 displayed with the rear display template 122 is "Thank You". The mirror light 111 and the rear light 121 are commercially available LED lights. The first switch 103 and the second switch 104 are readily and commercially available normally open momentary switches.

The following definitions and directional references were used in this disclosure:

Battery: As used in this disclosure, a battery is a container consisting of one or more cells, in which chemical energy is converted into electricity and used as a source of power.

Housing: As used in this disclosure, a housing is a rigid casing that encloses and protects one or more devices.

Vehicle: As used in this disclosure, a vehicle is a device that is used transporting carrying passengers, goods, or equipment. The term motorized vehicle refers to a vehicle can move under power provided by an electric motor or an internal combustion engine.

Directional References: The directional references used in this disclosure correspond the directional references from the perspective of the driver of a vehicle. The front 161 is the side of the vehicle proximal to the normal direction of travel. The rear 162 side is the side of the vehicle that is distal from the front 161. A signal from the invention 100 facing the front 161 direction will be visible by somebody facing the front 161 side of the vehicle. A signal from the invention 100 facing the rear 162 direction will be visible by somebody facing the rear 162 side of the vehicle.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which as defined in the following claims. Accordingly, the invention is to be limited only by the scope of the following claims and their equivalents.

What is claimed is:
1. A signaling system comprising:
a mirror display, a rear display, a first switch, and a second switch;
wherein the signaling system is adapted for use with a vehicle;
wherein the vehicle is further defined with a front and a rear;
wherein the signaling system is adapted to be installed into the vehicle electrical system;
wherein the mirror display is configured to display a first courtesy message;
wherein rear display is configured to display a second courtesy message;
wherein the mirror display further comprises a mirror light, a mirror display template, and a mirror housing;
wherein the mirror housing is an enclosure that contains the mirror light and the mirror display template;
wherein the mirror housing is configured to mount on the rearview mirror of the vehicle;
wherein the mirror housing mounts on the rearview mirror of the vehicle such that the mirror display faces the front direction;
wherein the interior of the mirror housing is made of reflective surfaces;
wherein the mirror light is a lamp that is mounted within the mirror housing;
wherein the mirror display template is a stencil type structure that is placed in a first opening and through which light is able to exit the mirror housing;

wherein when the mirror light is illuminated, the mirror display template blocks light exiting the mirror housing such that the first courtesy message is clearly visible;

wherein the rear display further comprises a rear light, a rear display template, and a rear housing;

wherein the rear housing is an enclosure that contains the rear light and the rear display template;

wherein the rear housing is configured to mount on the rear of the vehicle such that the rear display faces the rear direction;

wherein the interior of the rear housing is made of reflective surfaces;

wherein the rear light is a lamp that is mounted within the rear housing;

wherein the rear display template is a stencil type structure that is placed in a second opening and through which light is able to exit the rear housing;

wherein when the rear light is illuminated, the rear template blocks light exiting the rear housing such that the second courtesy message is clearly visible;

wherein the mirror display further comprises a first switch;

wherein the first switch is a normally open momentary switch;

wherein the first switch is mounted on the mirror housing;

wherein the rear display further comprises a second switch;

wherein the second switch is a normally open momentary switch;

wherein the second switch is mounted on the mirror housing.

* * * * *